United States Patent [19]

Welling et al.

[11] Patent Number: 6,041,296
[45] Date of Patent: *Mar. 21, 2000

[54] METHOD OF DERIVING CHARACTERISTICS VALUES FROM A SPEECH SIGNAL

[75] Inventors: Lutz Welling; Hermann Ney, both of Aachen, Germany

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/843,808

[22] Filed: Apr. 21, 1997

[30] Foreign Application Priority Data

Apr. 23, 1996 [DE] Germany ............................ 196 16 103

[51] Int. Cl.$^7$ ...................................................... G10L 1/00
[52] U.S. Cl. .......................... 704/209; 704/258; 704/217; 704/216; 704/251
[58] Field of Search .................................... 704/258, 264, 704/262, 219, 223, 209, 217

[56] References Cited

U.S. PATENT DOCUMENTS

| | | | |
|---|---|---|---|
| 4,081,605 | 3/1978 | Kitawaki et al. ........................ | 704/258 |
| 4,509,150 | 4/1985 | Davis ....................................... | 704/219 |
| 5,715,363 | 2/1998 | Tamura et al. ........................... | 704/205 |
| 5,732,388 | 3/1998 | Hoege et al. ............................ | 704/219 |

OTHER PUBLICATIONS

"A Model for Efficient Formant Estimation", XP–002074215, L.Welling, H.Ney, Aachen Germany, University of Technology, 1995, IEEE, pp. 797–800.
"Speech Spectral Segmentation for Spectral Estimation and Formant Modelling", XP–002074216, Harprit S. Chhatwal and Anthony G. Constantinides, Dept of Electrical Engineering, Imperial College, London U.K., 1987, IEEE, pp. 316–319.

Digital Processing of Speech Signals—"Linear Predictive Coding of Speech", XP–002074217, L.R. Rabiner et al, Prentice Hall, Englewood Cliffs, U.S. 1978, pp. 396–613.

"Digital Processing of Speech Signals" L. Rabiner et al, Prentice Hall, Englewood Cliffs, NJ 1978, p. 412.

*Primary Examiner*—David R. Hudspeth
*Assistant Examiner*—Daniel Abebe

[57] ABSTRACT

In a frequently used speech synthesis for voice output an excitation signal is applied to a number of resonators whose frequency and amplitude are adjusted in accordance with the sound to be produced. These parameters for adjusting the resonators may be gained from natural speech signals. Such parameters gained from natural speech signals may also be used for speech recognition, in which these parameter values are compared with comparison values. According to the invention, the parameters, particularly the formant frequencies, are determined by forming the power density spectrum via discrete frequencies from which autocorrelation coefficients are formed for consecutive frequency segments of the power density spectrum from which, in turn, error values are formed, while the sum of the error values is minimized over all segments and the optimum boundary frequencies of the segments are determined for this minimum. Via the autocorrelation coefficients, the LPC predictor coefficients can then be computed, from which coefficients the formant frequency is computed. The minimum of the error sum for the individual segments is found by way of dynamic programming, in which auxiliary values are initially computed from the power density spectrum and stored as Tables from which the autocorrelation coefficients are easily determined for individual frequency segments which are required for the computations in the dynamic programming process.

3 Claims, 1 Drawing Sheet

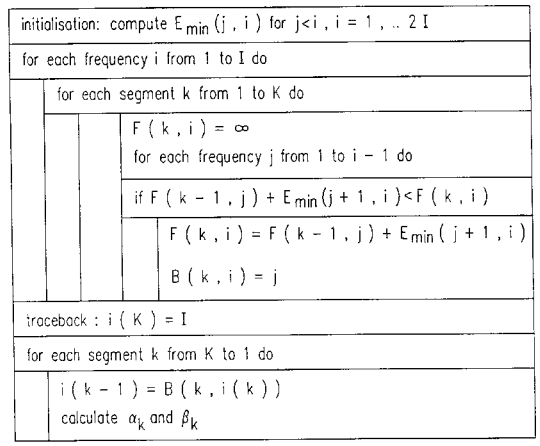

| |
|---|
| initialisation: compute $E_{min}(j, i)$ for $j < i$, $i = 1, ..2I$ |

| | |
|---|---|
| for each frequency i from 1 to I do | |

| | | |
|---|---|---|
| | for each segment k from 1 to K do | |

| | | | |
|---|---|---|---|
| | | $F(k, i) = \infty$ <br> for each frequency j from 1 to i − 1 do | |

| | | | |
|---|---|---|---|
| | | | if $F(k - 1, j) + E_{min}(j + 1, i) < F(k, i)$ |

| | | | | |
|---|---|---|---|---|
| | | | | $F(k, i) = F(k - 1, j) + E_{min}(j + 1, i)$ <br> $B(k, i) = j$ |

| |
|---|
| traceback : $i(K) = I$ |

| |
|---|
| for each segment k from K to 1 do |

| | |
|---|---|
| | $i(k - 1) = B(k, i(k))$ <br> calculate $\alpha_k$ and $\beta_k$ |

METHOD OF DERIVING CHARACTERISTICS VALUES FROM A SPEECH SIGNAL

BACKGROUND AND SUMMARY OF THE INVENTION

The invention generally relates to the field of speech signal processing, particularly speech recognition and voice output.

In speech output, individual short speech segments are generated which time-sequentially yield a speech signal closely resembling an expression uttered in natural speech. For generating the individual speech segments, it is desirable to use a minimal number of parameters which nevertheless model a speech segment as accurately as possible. These parameters are based on the natural speech track which has different resonance frequencies with generally different bandwidths for generating different sounds. The resonance frequencies in the speech signal are called formant frequencies, and their indication and their bandwidth is then sufficient for generating different sounds. These parameters may advantageously be gained from a natural speech signal.

However, gaining these parameters from a natural speech signal may also be used for speech recognition. In this case, a speech signal is divided into short periods, and characteristic values are derived from each period and compared with reference values which correspond to given sounds. By further processing the results of the comparison, it can be determined which expression was most probably uttered. The characteristic values may be, for example, the energies in successive frequency segments. However, good results can also be achieved when the formant frequencies are used as characteristic values. With these frequencies, many deviations of really uttered expressions from the reference values used for the recognition can be better taken into account.

It is an object of the invention to provide a method with which the formant frequencies or the characteristic values indicating these formant frequencies can be determined from a speech signal in a reliable manner and with a relatively small number of computations so that, essentially, real-time processing is possible.

According to the invention, this object is solved in that initially the power density spectrum is formed via discrete frequencies of consecutive periods of the speech signal. For a predetermined, first number of consecutive segments of the power density spectrum, the first three autocorrelation coefficients are formed in each of these periods. For this purpose, the boundary frequencies of the segments must be determined, which are optimal for an approximation by a model function with a number of formant frequencies corresponding to the number of segments. For this determination of the boundary frequencies, an error value is formed from the autocorrelation coefficients for each segment, and the error values of all segments are summed, and the formation of the autocorrelation coefficients and the error values is repeated for different boundary frequencies between the segments until the minimum of the sum of the error values and the associated optimum boundary frequencies have been determined. Finally, at least one characteristic value is derived from the autocorrelation coefficients of the segments with the optimum boundary frequencies for each segment. These values may be prediction coefficients which can be directly determined from the autocorrelation coefficients, or the resonance frequencies and possibly the bandwidth which unambiguously results again from the prediction coefficients.

The direct formation of the autocorrelation coefficients for given frequency segments of the power density spectrum requires some computation. In accordance with an embodiment of the invention, a simpler mode of forming such autocorrelation coefficients from the power density spectrum is to determine a group of auxiliary values from the power density spectrum for each period, which auxiliary values represent the autocorrelation coefficients from the lowest frequency up to a given higher frequency. These auxiliary values are stored in a Table and associated with the respective higher frequency. An autocorrelation coefficient for a given frequency segment is then determined from the difference between two values in the Table. The latter process only requires a simple computation, while the Table is determined only once in each period with a boundary computation time.

The optimum boundary frequencies, at which the sum of the error values is minimal, are essentially determined in accordance with the principle of dynamic programming. For this purpose, a further auxiliary value is used which represents the error for the optimum division of the frequency segment from the lowest frequency up to a higher frequency into a given number of segments. Consecutive, higher frequencies are subdivided into two frequency intervals, with the interval boundary stepwise assuming all frequencies, and when this auxiliary value is larger than the sum of the auxiliary value achieved at the previous boundary of the segment and the error value for the range between the interval boundary and the instantaneous higher frequency, then the new error value is set to this sum value and the associated interval boundary is stored simultaneously. When this has been effected for all higher frequencies up to the maximum frequency, the absolute, optimum segment boundarys are then obtained by way of traceback.

DETAILED DESCRIPTION

Mathematically, the method according to the invention proceeds as follows.

Starting point is the LPC predictor polynomial $$A_k(e^{j\omega})=1-\alpha_k e^{j\omega}-\beta_k e^{2j\omega}$$

with the predictor coefficients $\alpha_k$ and $\beta_k$ from which the formant frequency $\phi_k$ can be determined as follows $$\varphi_k = \arccos\left(-\frac{\alpha_k(1-\beta_k)}{4\beta_k}\right)$$

In order to determine a number K of formant frequencies, the frequency spectrum must be divided into K segments, in which the boundary frequencies for the segments are to be chosen in such a way that the error with respect to a given short-time power density spectrum $|S(e^{j\omega})|^2$ becomes minimal. In accordance with the book by L. Rabiner, R. -W. Schafer, "Digital Processing of Speech Signals", Prentice Hall, Englewood Cliffs, N.J., 1978, the minimal error value leads to the expression $$\alpha_k^{opt} = \frac{r_k(0)r_k(1) - r_k(1)r_k(2)}{(r_k(0))^2 - (rk(1))^2}$$

$$\beta_k^{opt} = \frac{r_k(0)r_k(2) - (r_k(1))^2}{(r_k(0))^2 - (r_k(1))^2}$$

In this expression, $r_k(n)$ is the autocorrelation coefficient of the segment k for n=0, 1, 2. These autocorrelation coefficients can be computed from the power density spectrum of the speech signal. The minimal error value for a segment with the boundary frequencies $\omega_{k-1}$ and $\omega_k$ can be expressed as follows $$E_{min}(\omega_{k-1}, \omega_k) = r_k(0) - \alpha_k^{opt} r_k(1) - \beta_k^{opt} r_k(2)$$

To determine the optimal boundary frequencies for all segments, the sum of the error values for all segments should become a minimum. For computing this minimum, the autocorrelation coefficients should be used for different frequency segments of the power density spectrum. To simplify this computation, an auxiliary value $T(n,i)$ is introduced $$T(n, i) = \sum_{i=0}^{i} (S(l))^2 \cos\frac{2\pi nl}{2I}$$

with n=0, 1, 2 and i=0, 1, ..., 2I as a sequence of discrete frequencies.

This auxiliary value thus constitutes a group of values which is stored in the form of a Table with the frequency i as an independent value. The autocorrelation coefficients for the single segments can be determined from this Table by means of the difference between two values in the Table $$r_k(n) = T(n, i_k) - T(n, i_{k-1})$$

The use of two Table values and the formation of their difference requires only a very short time so that the determination of the minimal error sum is not noticeably affected thereby.

The minimal error sum is essentially determined in accordance with the principle of dynamic programming. For this purpose, an auxiliary value $F(k,i)$ is introduced which indicates the error for the optimal division of the frequency interval from 1 to i into k segments. Due to the subdivision of the frequency interval from 1 to i into two frequency intervals from 1 to j and from j+1 to i and taking into account that the auxiliary value $F(k,i)$ represents a kind of error value and is to be minimized, the recurrence relation of the dynamic programming is obtained $$F(k, l) = \min_{j} [F(k-1, j) + E_{min}(j+1, i)]$$

This relation shows that the best division of the frequency interval from 1 to j into (k−1) segments is used so as to determine the subdivision of the frequency interval from 1 to i into k segments.

The overall procedure for determining the optimal boundary frequencies for the segments with a minimal error sum, using dynamic programming, is shown in the FIGURE. This procedure starts after determining the power density spectrum from the speech signal for a predetermined period of time and after computing the values for the mentioned Table for determining the autocorrelation coefficients for different frequency segments, and comprises initially the determination of the individual error values $E_{min}(j+1,i)$ for different values of j and i within the boundarys indicated in the FIGURE. This determination of the minimal error values is realized by means of the previously indicated relation in which $\alpha_k^{opt}$ and $\beta_k^{opt}$ are only expressed by $r_k(n)$, and yields a matrix of values which is stored. In the next loop through the frequency i, the segments k and the subdivision frequency j, the auxiliary value $F(k,i)$ is always substituted when it is larger than the sum of the auxiliary value for the previous segment up to the interval boundary j and the error for the remaining part of the interval, while a backward indicator $B(k,i)$ is stored each time. When all loops up to the highest frequency I have been run through, the optimum boundary frequency for each segment is read by traceback of thess backward indicators, and the prediction coefficients $\alpha_k$ and $\beta_k$ are calculated from the autocorrelation coefficients for these optimum boundary frequencies, from which the formant frequencies for the individual segments can be calculated.

It will be evident that this procedure must be repeated for each one of the consecutive periods of time so that time sequences of formant frequencies are obtained from the speech signal.

We claim:

1. A method of deriving characteristic values from a speech signal, comprising the steps of:

a) dividing a speech signal into periods of time;

b) forming a power density spectrum via discrete frequencies of the periods of time of the speech signal;

c) forming the first three autocorrelation coefficients for a predetermined first number K of consecutive segments of the power density spectrum;

d) forming an error value from autocorrelation coefficients for each segment and summing the error values of all segments;

e) repeating the formation of the autocorrelation coefficients and the error values for different boundarys between the segments and determining the optimum boundary frequencies at which the sum of the error values has a minimum;

f) deriving at least a characteristic value for each segment from the autocorrelation coefficients of the segments of the optimum boundary frequencies; and g) processing the at least one characteristic value for each segment for speech recognition.

2. A method as claimed in claim 1 in which, for each period of time, the number of auxiliary values for a part of the power density spectrum, starting from the lowest frequency up to consecutive, higher frequencies, is determined and is stored as a Table, and in which the autocorrelation coefficients are determined during the dynamic programming from differences between the values in the Table.

3. A method as claimed in claim 1 in which the minimum value of the sum of the error values is determined in accordance with the method of dynamic programming, in which an optimum division into two segments is successively determined for consecutive discrete frequencies by using a dynamic auxiliary value which indicates the smallest error for dividing a segment from a lowest frequency to the actual one of the consecutive frequencies and for different boundary frequencies between the lowest and the actual frequency the minimum value of the sum of the auxiliary value for this boundary frequency and the error value for the segment between the boundary frequency and the actual frequency is determined, and this sum is used as a new auxiliary value.

* * * * *